United States Patent [19]

Shin et al.

[11] Patent Number: 5,018,809
[45] Date of Patent: May 28, 1991

[54] FABRICATION METHOD AND STRUCTURE OF OPTICAL WAVEGUIDES

[75] Inventors: Sang Y. Shin; Yung S. Son, both of Seoul, Rep. of Korea

[73] Assignee: Korea Advanced Institute of Science and Technology, Seoul, Rep. of Korea

[21] Appl. No.: 557,619

[22] Filed: Jul. 24, 1990

[30] Foreign Application Priority Data

Aug. 10, 1989 [KR] Rep. of Korea ................ 1989-11376

[51] Int. Cl.5 ................................................ G02B 6/10
[52] U.S. Cl. ............................. 350/96.12; 204/192.26; 350/320
[58] Field of Search ............... 350/96.11, 96.12, 96.13, 350/96.14, 96.15, 320; 204/192.1, 192.11, 192.15, 192.26

[56] References Cited

U.S. PATENT DOCUMENTS

| | | |
|---|---|---|
| 4,695,121 | 9/1987 | Mahapatra et al. .............. 350/96.12 |
| 4,725,774 | 2/1988 | Davis et al. ................... 350/96.11 X |
| 4,755,014 | 7/1988 | Stoll et al. ....................... 350/96.12 |
| 4,778,236 | 10/1988 | Miyawaki ......................... 350/96.14 |
| 4,799,750 | 1/1989 | Miyawaki ......................... 350/96.13 |

*Primary Examiner*—John D. Lee
*Attorney, Agent, or Firm*—Wyatt, Gerber, Burke & Badie

[57] ABSTRACT

An optical waveguide fabrication technique utilizing a self-aligned cladding in which an efficient and reliable optical waveguide can be fabricated with minimum proton exchange; the guided mode property of the optical waveguide can be widely adjusted; and the optical waveguides can be fabricated in various types.

16 Claims, 1 Drawing Sheet

FIG. 1
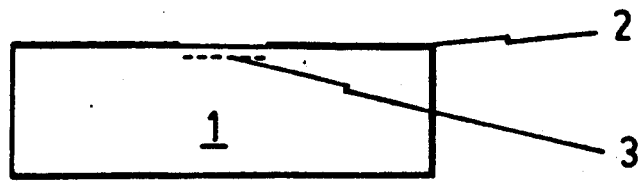
FIG. 1A
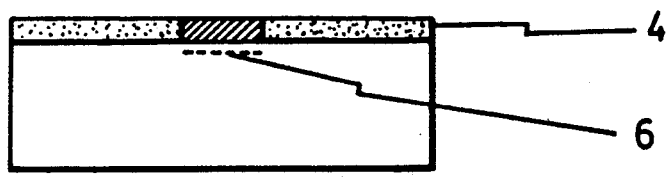
FIG. 1B
FIG. 1C
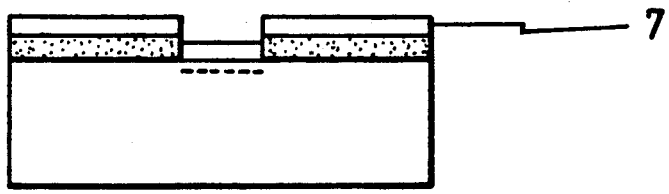
FIG. 1D
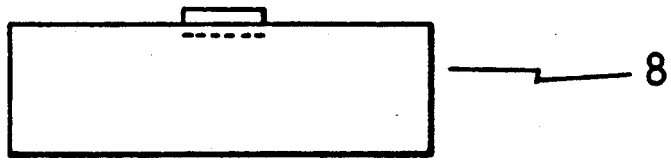
FIG. 1E
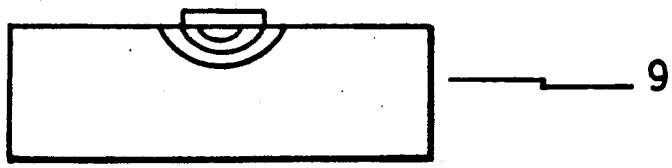
FIG. 1F

FABRICATION METHOD AND STRUCTURE OF OPTICAL WAVEGUIDES

FIELD OF THE INVENTION

The present invention relates to a structure and a fabrication method for an optical waveguide which, as a basic structure of integrated optics, is proton-diffused after forming a self-aligned $SiO_2$ - cladding on a lithium niobate ($LiNbO_3$) single crystal substrate. The present invention is also applicable to the fabrication of ion-exchanged glass optical waveguides in which glass is used as a substrate material.

BACKGROUND OF THE INVENTION

Integrated optics is the technique of manipulating light (photons) by miniature optical elements formed on a thin layer, like integrated circuits is the operating of electrons by numerous electronic elements formed on a thin layer.

The thin film optical waveguide is the basic structure of optical elements used in integrated optics. Among optical waveguides, the optical waveguide using a lithium niobate (ferroelectric) ($LiNbO_3$) single crystal substrate has been extensively studied since the 1970s, because from $LiNbO_3$ various optical elements can be fabricated e.g., the optical modulator/switch which uses the electro-optic effect.

The most extensively used and most developed technique for fabricating an optical waveguide, particularly having a $LiNbO_3$ single crystal is the titanium (Ti) indiffusion method. This method is carried out at a high temperature (about 1000° C.), with the result that the lithium ions are outdiffused to the surface of the crystal, thereby increasing its refractive index. In waveguides fabricated by this method, when an extraordinary wave is guided which uses a large electro-optic effect, there is a disadvantage that a surface guiding phenomenon occurs. Further, in such waveguides optical damages due to the photorefractive effect is produced from light in the visible light region, thereby making them difficult to be practical.

In the 1980s, came the development of the proton exchange method for fabricating an optical waveguide such as from $LiNbO_3$ in which a chemical reaction is performed at a temperature lower than that used in the Ti indiffusion method (i.e. about 200° C.)

In the proton exchange method a substrate is immersed in a benzoic acid ($C_6H_5COOH$) solution to exchange the lithium ions with protons. In this method, a large variation of the refractive index can be obtained, and the total time for the whole process can be shorter than the time in titanium indiffusion method. However, in the proton exchange method, the proton exchange reaction occurs abruptly; and, the resultant products have non-uniform characteristics. From the proton exchange fabrication process, optical waveguides have instabilities which become apparent and become a problem in the use thereof shortly after the fabrication. Therefore, this method is too fastidious to fabricate a single mode optical waveguide for practical use in integrated optics. The proton exchange method also suffers from a further problem in that the electro-optic effect which is characteristic of the lithium niobate is markedly lowered in waveguides from this method.

Recently, there have been proposals to overcome the above-described disadvantages of the proton exchange method. The first calls for a proton exchange method carried out such that benzoic acid solution is buffered with lithium ions, and is characterized in that the proton exchange reactions are moderated by means of the lithium ions. However, this proposal does not have practicality because the reaction time therein is too long to form the optical waveguide, and the reaction is sensitive to the lithium ion concentration in the solution.

A second proposal calls for a proton exchange method carried out such that, after the proton exchanges, the protons that have exchanged into the lithium niobate crystal are annealed therein by applying a temperature of over 350° C. In this proposal, due to abrupt proton exchange reactions, the excessively exchanged protons gain heat energy which causes them to be outdiffused, with the result that the internal stress of the crystal structure is relaxed. However, in this proposal, the lithium ions, up to as many as the number of the exchanged protons during the exchange process, are transferred into the solution and cannot return to their original positions. In an attempt to overcome this phenomenon, only as many protons as are required for forming the optical waveguide are exchanged; and then, the protons have to be diffused only as deep as required, with the outdiffusion of the protons inhibited. However, this modification to the second proposal provides a process which is a very fastidious one.

SUMMARY OF THE INVENTION

The present invention is intended to overcome the above-described disadvantages of the conventional techniques.

It is an object of the present invention to provide an optical waveguide having a superior quality. It is also an object of the present invention to provide an improved method for forming an optical waveguide.

The present invention thus provides a method for forming an optical waveguide wherein, proton exchange is weakly carried out at a relatively low temperature (e.g., 120–180° C., typically 140–160° C., preferably about 145–155° C., more preferably 150° C.), and then, proton diffusion is carried out at a high temperature (e.g., 370–430° C., typically 390–410° C., preferably about 395–405° C., more preferably 400° C.) after forming a self-aligned dielectric ($SiO_2$) cladding. While ranges are provided for performing steps in the method of this invention, it is preferred that exchange and diffusion each be carried out at a constant temperature within the herein provided ranges.

The present invention provides a method for manufacturing an optical waveguide comprising:

forming a substrate having a top face and a bottom face, forming mask channel patterns on said top face of said substrate to form a channelled substrate, subjecting said channelled substrate having a mask thereon to minimum, low temperature proton exchange for a desired period of time to form an exchanged substrate, coating a photoresist onto the top face of said exchange of substrate to form a photoresist substrate, subjecting the bottom face of said photoresist substrate to exposure to achieve an aligned pattern corresponding to said mask channel pattern, depositing on said top face of said exposed substrate a dielectric to form a substrate having a self-aligned dielectric cladding, and, subjecting said substrate having a self-aligned dielectric cladding to proton diffusion for a desired time at a desired temperature.

The present invention further provides an optical waveguide of proton diffusion type comprising a substrate having an optical waveguide pattern thereon; and a self-aligned dielectric cladding formed on said waveguide pattern;

wherein said dielectric cladding serves as a mask for inhibiting the outdiffusion of protons and promoting the indiffusion of said protons when said waveguide pattern is proton-diffused.

BRIEF DESCRIPTION OF THE DRAWING

The above objects and other advantages of the present invention will become more apparent by describing a preferred embodiment of the present invention with reference to the attached drawing in which:

FIG. 1, which consists of views A-F (called FIGS. 1A, 1B, 1C, 1D, 1E and 1F herein), illustrates the fabrication process for the optical waveguide with a self-aligned dielectric cladding according to an embodiment of the present invention.

DETAILED DESCRIPTION

Referring to FIG. 1A, metallic mask channel patterns 2A are formed upon lithium niobate (LiNbO$_3$) substrate 1 by the lift-off technique at surface 2. The channelled substrate and benzoic acid powder (or crystals) are respectively inserted into the upper and lower parts of a glass tube which also has a narrowed portion in the middle such as a sandglass (hour glass), and then the glass tube is sealed.

The sealed glass tube is put into a furnace and is heated to a temperature of about 150° C. Upon reaching the desired temperature, the glass tube is inverted so that the substrate is immersed into the melted benzoic acid, causing proton exchange to occur. Dotted line 3 in FIG. 1A denotes the protons exchanged in the melted benzoic acid at about 150° C. By altering the pressure, one can alter the temperature for melting the benzoic acid.

After carrying out proton exchange for a desired period of time (e.g., 1-4 hours), the glass tube is removed from the furnace, and restored to its original position, from the upside down position, and then, it is cooled. Cooling can occur by allowing the glass tube to sit and achieve a lower temperature. After cooling, a photoresist 4 is coated onto the substrate 1 (FIG. 1B) self-aligned pattern 4A is formed on the substrate 1. In particular, bottom face 1B of substrate 1 is exposed, e.g., by illumination or exposure to ultra violet (UV) light. Arrows 5 in FIG. 1C illustrates UV light exposure to surface 1B which achieves alignment of proton exchanged region 6 (FIG. 1B). Self-aligned pattern 4A is formed on substrate 1 when substrate 1 has the metallic mask used for the proton exchange kept thereon (i.e., a single mask is used twice).

After developing photoresist 4 (which causes pattern 4A to be removed from substrate 1), dielectric (SiO$_2$) 7 is deposited, e.g., by radio frequency sputtering (RF sputtering) (FIG. 1D), with the position 7A sitting against substrate 1 where pattern 4A was removed to form dielectric (SiO$_2$) cladding 8 by the lift-off technique (FIG. 1E).

Dielectric (SiO$_2$) cladding 8 is used as a mask for inhibiting the outdiffusion of the protons, and for promoting the indiffusion of the protons. To carry out the proton diffusion step, substrate 1 having dielectric (SiO$_2$) cladding pattern 8 is put into a furnace, for a desired period of time (e.g., 10-100 minutes) and at a desired temperature (e.g., 400° C.) to thereby obtain optical waveguide 9 (FIG. 1F). The furnace can be present in accordance with proton exchange conditions. In FIG. 1F, the semi-circles 9A denote protons diffused into substrate 1 and the diffusion pattern schematically. As mentioned earlier, this method can also be applied to not only LiNbO$_3$ single crystal substrate but also to glass substrate to form ion-exchanged glass optical waveguides.

The present invention constituted as above will now be described as to its effects.

First, as the proton exchange is carried out at a low temperature (e.g., 150° C.), the reaction due to the benzoic acid can be moderated without requiring the solution to be buffered by the lithium ions. Thus, in the present invention, control of the degree of the proton exchange is simpler than in past procedures. Further, bottom face 1B of the substrate is exposed for dielectric (SiO$_2$) cladding 8 to be formed only on the portions of the substrate which are proton-exchanged and to be proton-diffused. Therefore, in the present invention the indiffusion of the protons is efficiently promoted and the outdiffusion of the protons is effectively inhibited.

That is, in the present invention with minimum proton exchange, optical waveguides can be produced. Further, if laterally diffused protons depart from the region masked by dielectric (SiO$_2$) cladding 8, they are outdiffused from substrate 1, thereby providing an advantage of the present invention: In the present invention the proton concentration distribution (9A, FIG. 1F) is confined within the region of dielectric (SiO$_2$) cladding 8.

Therefore, the lateral mode is well confined, and accordingly, the radiation loss can be structurally reduced, thereby increasing the degree of integration.

Dielectric (SiO$_2$) cladding 8 lies between the optical waveguide and the air layer, and therefore, any steep variation of the refractive index over the face of the optical waveguide can be buffered, thereby contributing to keeping the waveguide mode symmetrical in depth direction. As a result, any coupling loss between a waveguide of the present invention and an optical fiber which has a circular symmetric mode profile can be reduced.

Based on these effects disclosed herein, the proton exchange time, the width of the dielectric (SiO$_2$) cladding and the proton diffusion time features of the present invention can be adjusted by the skilled artisan to control as desired a guided mode property (such as shape and size) of an optical waveguide herein. Thus, the present invention makes it possible to fabricate optical waveguides having various characteristics.

Further, according to the present invention, if the substrate material is able to transmit through it light from a light source, a self-aligned pattern can be fabricated. Therefore, the present invention is applicable to the fabrication of widely used ion-exchanged glass optical waveguides in which glass is used as a substrate material.

As described above, the present invention provides a reliable method for fabrication of an optical waveguide which will be a necessity in the coming optoelectronic era. In a commercial embodiment of the method of the present invention to produce optical waveguides according to the present invention, mass production is employed to perform the proton exchange. In such mass production the proton exchange is carried out in a large quantity of benzoic acid solution or molten benzoic acid which is used to apply a photoresist (4, FIGS. 1B, 1D) and pattern (4A, FIG. 1B) on substrates of a wafer scale, and the formation of the dielectric cladding is by a photolithography process such as those used in the mass production of semiconductors. In mass production of the present invention, the proton diffusion is carried out in a furnace which can hold substrates of wafer scale. Thus, mass production is an embodiment of the present invention in addition to the one by one process described above.

As used herein: The outdiffusion of protons means that the protons in the substrate are diffused out of the substrate by proton exchange during the proton diffusion step. The indiffusion of protons means that the protons in the substrate are diffused into the substrate by proton exchange in the depth direction during the proton diffusion step. Indiffusion and outdiffusion occur simultaneously during the proton diffusion step.

Having thus described in detail preferred embodiments of the present invention, it is to be understood that the invention defined by the appended claims is not to be limited by particular details set forth in the above description as many apparent variations thereof are possible without departing from the spirit or scope of the present invention.

From the foregoing, it will be apparent that the present invention provides advantages such that it is a simpler manufacturing process when compared with the currently well developed semiconductor manufacturing process, and when compared with present techniques for making optical waveguides. Therefore, the present invention is a pioneer innovation because it is forecastingly capable of being adopted as the basic practical technique in this field.

What is claimed is:

1. An optical waveguide of proton diffusion type comprising a substrate having an optical waveguide pattern thereon; and
    a self-aligned dielectric cladding formed on said waveguide pattern;
    wherein said dielectric cladding serves as a mask for inhibiting the outdiffusion of protons and promoting the indiffusion of said protons when said waveguide pattern is proton-diffused 2. The optical waveguide of claim 1 wherein the substrate comprises lithium niobate.

3. The optical waveguide of claim 2 wherein the selfaligned dielectric cladding comprises $SiO_2$.

4. The optical waveguide of claim 1 wherein the substrate comprises glass.

5. The optical waveguide of claim 4 wherein the selfaligned dielectric cladding comprises $SiO_2$.

6. The optical waveguide of claim 1 having protons diffused and a diffusion pattern in the substrate which can be represented schematically as semicircles beneath the cladding; said semicircles having their concavity facing the cladding.

7. A method for manufacturing an optical waveguide comprising:
    forming a substrate having a top face and a bottom face,
    forming mask channel patterns on said top face of said substrate to form a channelled substrate, subjecting said channelled substrate having a mask thereon to minimum, low temperature proton exchange for a sufficient period of time to form an exchanged substrate,
    coating a photoresist onto the top face of said exchanged substrate to form a photoresist substrate, subjecting the bottom face of said photoresist substrate with the mask used in proton exchange thereon to exposure to achieve an exposed substrate having an aligned pattern corresponding to said mask channel pattern,
    depositing on said top face of said exposed substrate a dielectric to form a substrate having a self-aligned dielectric cladding; and,
    subjecting said substrate having a self-aligned dielectric cladding to proton diffusion for a sufficient time at a sufficient temperature to effect said proton diffusion.

8. The method of claim 1 wherein said mask channel patterns are metallic and formed by a lift-off technique.

9. The method of claim 7 wherein the proton exchange comprises immersing the channelled substrate in benzoic acid or a benzoic acid solution at a substantially constant temperature between 145° and 155° C. for 1 to 4 hours.

10. The method of claim 9 wherein the proton diffusion comprises heating the substrate having a self-aligned dielectric cladding at a constant temperature between 395° and 405° C. for a time comprising 10 to 100 minutes.

11. The method of claim 10 wherein the exposure is to ultraviolet light.

12. The method of claim 11 wherein the substrate comprises lithium niobate.

13. The method of claim 7 wherein the dielectric comprises $SiO_2$.

14. The method of claim 11 wherein the substrate comprises glass.

15. The method of claim 14 wherein the dielectric comprises $SiO_2$.

16. The method of claim 7 wherein the proton diffusion comprises heating the substrate having a self-aligned dielectric cladding at a substantially constant temperature between 395° and 405° C. for a time comprising 10 to 100 minutes.

* * * * *